United States Patent [19]

Hanada et al.

[11] Patent Number: 5,348,348
[45] Date of Patent: Sep. 20, 1994

[54] DATA-WRITTEN MEDIUM

[75] Inventors: Koji Hanada; Makiko Hamuro; Takeshi Yoshikawa; Toru Ohmura; Motohiko Kashioka, all of Tokyo, Japan

[73] Assignee: Toyo Ink Manufacturing Co., Ltd., Tokyo, Japan

[21] Appl. No.: 840,479

[22] Filed: Feb. 24, 1992

Related U.S. Application Data

[63] Continuation-in-part of Ser. No. 587,784, Sep. 26, 1990, abandoned.

[30] Foreign Application Priority Data

Sep. 26, 1989 [JP] Japan ................................. 250174
Dec. 8, 1989 [JP] Japan ................................. 317682

[51] Int. Cl.⁵ .............................................. B42D 15/00
[52] U.S. Cl. ...................................... 283/91; 283/117; 283/901; 283/904
[58] Field of Search ................. 283/91, 117, 901, 904

[56] References Cited

U.S. PATENT DOCUMENTS

| | | | |
|---|---|---|---|
| 4,626,445 | 12/1986 | Dobrowolski | 283/91 X |
| 4,753,923 | 6/1988 | Byers et al. | 503/227 |
| 4,936,916 | 6/1990 | Shinmitsu et al. | 283/117 X |
| 4,943,093 | 7/1990 | Melling et al. | 283/91 X |

FOREIGN PATENT DOCUMENTS

| | | |
|---|---|---|
| 0249885 | 12/1987 | European Pat. Off. . |
| 2654208 | 5/1978 | Fed. Rep. of Germany . |
| 1570578 | 6/1969 | France . |
| 63-112190 | 5/1988 | Japan . |

*Primary Examiner*—Paul A. Bell
*Attorney, Agent, or Firm*—Wenderoth, Lind & Ponack

[57] ABSTRACT

A data-written medium in which the data is readable with a light source having a main wavelength of 600 to 700 nm, the medium comprising a substrate and an ink layer containing not more than 0.1 g/m² of a chromatic color dyestuff having absorption substantially at 600 to 700 nm and at least one other color dyestuff as the remainder. The ink layer is formed on the substrate so as to have a form constituting the data. Also provided is a data-written medium in which the data is readable with light sources having a main wavelength of 600 to 1,500 nm, the medium comprising a substrate, a first ink layer containing not more than 0.1 g/m² of a chromatic color dyestuff having substantial absorption at 600 to 700 nm and another dyestuff as the remainder, and a second ink layer containing a substance having substantial absorption in a near infrared region. Each of the two ink layers is formed so as to individually have a form constituting to two corresponding data.

16 Claims, No Drawings

DATA-WRITTEN MEDIUM

This application is a continuation-in-part of Ser. No. 07/587,784 filed Sep. 26, 1990, now abandoned.

BACKGROUND OF THE INVENTION

1. Field of the Invention

This invention relates to a data-written medium having a variety of colors, whose data can be read with a light source having a main wavelength of 600 to 700 nm. More specifically, it relates to a bright-colored data-written medium whose data can be read with a light source having a main wavelength of 600 to 700 nm and which is functionally excellent in the prevention of falsification and forgery.

2. Description of Related Art

In recent years, control systems using bar codes such as physical distribution control systems, product control systems, material control systems, inventory control systems and POS systems have been developed and applied to various fields as a means of obviating complicated key inputting and bookkeeping. The procedures for marking bar codes are classified into a source marking procedure for producing a large number of identical bar codes and an in-store marking, in-house marking or on demand marking procedure for producing a limited amount of individual bar codes. The former procedure is carried out by an offset printing, gravure printing, flexographic press printing, relief printing, or screen printing method. The latter procedure is carried out by using a printer of a thermal transfer, thermal coloring or wire dot type, an ink-jet printer, a laser printer, or the like. Data processing is usually carried out as follows. Printed bar bode or character data is measured for its reflective strength by means of a light source such as a 632.8 nm He-Ne laser, a 660 nm light-emitting diode, a 670 nm visible light laser diode, a 690 nm light-emitting diode, a 780 nm laser diode, a 940 nm infrared-emitting diode, or the like, inputted as coded data or character data, and processed with a computer.

In general, the inks used to print these bar code and character data contain, as a dyestuff, a carbon black having an absorption in a wide range from a visible light region to a near infrared light region. And, due to bar code designing or in order to improve product evaluation, a study is made of the following inks or materials: dark (brown, dark blue, dark green, etc. ) chromatic color inks containing carbon black in combination, blue or green pigment-containing inks for detection with a 600 to 700 nm light source, thermal coloring paper using light-emission of a leuco dye, nigrosine type dye-containing inks for an ink-jet printer; and the like.

These inks or materials for any use are required to have sufficient absorption characteristics in the wavelength region of a light source to detect the data. In particular, the selection of light absorbers for a specific wavelength is essential to determine color indication on hue, saturation and brightness, detection sensitivity or weatherability of the data-written medium.

When near infrared absorbers are used, no absorption occurs in the visible light region, and therefore, even the combined use of these materials with a chromatic color dyestuff does not change the brightness, hue, saturation, etc., of the dyestuff itself. However, when an attempt is made to detect light absorption at a 600 to 700 nm (so-called visible light) wavelength region in order to read coded data or character data, it has been impossible to produce a data-written medium of any color other than blue or green, since the absorber itself has its own color.

On the other hand, in recent years, bar code readers increasingly use a 600 to 700 nm visible light wavelength region, since a shorter wavelength can be increasingly used for detection, and the sensitivity of a detection device has been increased with the development in the laser diode, the gas laser and the charge coupled device.

In view of the above problems, the present inventors have made a study to achieve the following characteristics of an absorber to be used in the 600 to 700 run visible light region.

1) The absorber is required to have sufficient absorption in the 600 to 700 nm wavelength region.

2) The absorber is required to exhibit lower absorption of light in a 400 to 600 wavelength region.

3) The absorber is required to have light resistance higher than that of conventional printing inks.

As a result, the present inventors have found that a data-written medium which can have a variety of colors usable with a conventional bar code reader or an optical character reader can be obtained by using 0.1 g/m$^2$, in an ink layer, of a chromatic color dyestuff having substantial absorption at 600 to 700 nm in combination with at least one other dyestuff. That is, it has been found that when not more than a specified amount of the chromatic color dyestuff is applied in combination with at least one other warm color dyestuff, a clear-color data storage medium free from turbidity, e.g., a barcode, can be obtained.

SUMMARY OF THE INVENTION

It is an object of this invention to provide a data-written medium which has an ink layer having a variety of colors and a form constituting the data and whose data can be read with a light source having a main wavelength at 600 to 700 nm.

It is another object of this invention to provide a data-written medium having bar code or character data having a variety of colors.

It is further another object of this invention to provide a data-written medium having a warm color, whose data can be read with a light source having a main wavelength at 600 to 700 nm.

It is yet another object of this invention to provide a bright-colored data-written medium, whose data can be read with a light source having a main wavelength at 600 to 700 nm.

Further, it is another object of this invention to provide a data-written medium having at least two kinds of variously colored data in one place, whose data can be individually read.

According to this invention, there is provided a data-written medium whose data is readable with a light source having a main wavelength of 600 to 700 nm, the medium comprising a substrate and an ink layer containing not more than 0.1 g/m$^2$ of a chromatic color dyestuff having absorption substantially at 600 to 700 nm and at least one other dyestuff as the remainder, the ink layer being formed on the substrate so as to have a form constituting the data.

Further, according to this invention, there is provided a data-written medium whose data is readable with light sources having a main wavelength of 600 to 1,500 nm, the medium comprising a substrate, an ink layer containing not more than 0.1 g/m$^2$ of a chromatic color dyestuff having substantial absorption at 600 to 700 nm and at least one other dyestuff as the remainder, and another ink layer containing a substance having substantial absorption in the near infrared region, each of the two ink layers being formed so as to individually have a form constituting the corresponding data.

DETAILED DESCRIPTION OF THE INVENTION

The larger the content of the dyestuff which has substantial absorption at 600 to 700 nm is, the higher the absorption, and the higher the reading sensitivity of written data. As can be easily assumed, however, as the above content increases, the density and visual sensitivity of data increases. In particular, when the above dyestuff is used in combination with the other dyestuff, the brightness, hue and saturation of the written data sharply decreases. And, there is a defect in that the written data shows so-called turbidity to a great extent. Therefore, when the above dyestuff is used in combination with the other dyestuff to produce a warm color bar code or character data of red, orange, yellow, or the like, the amount of such dyestuff (which has substantial absorption at 600 to 700 nm) is preferably not more than 0.1 g/m$^2$, more preferably 0.08 g/m$^2$ to 0.005 g/m$^2$. When this amount exceeds 0.1 g/m$^2$ the turbidity of the resultant written data increases. When this amount is less than 0.005 g/m$^2$, the detection sensitivity of the resultant data medium decreases.

The amount of the ink to form the ink layer depends on kind of ink, concentration of the dyestuff and printing method. In general, the amount of ink is 1 to 15 g/m$^2$, preferably 10 g/m$^2$ for a thermal transfer ribbon, and about 0.1 to about 2 g/m$^2$ for offset printing.

Examples of the chromatic dyestuff having substantial absorption at 600 to 700 nm as used in this invention are purple dyestuffs typefied by inorganic pigments such as Manganese Violet, Cobalt Violet Deep and Cobalt Violet Light, azo pigments such as Fast Violet B; basic dye type lakes such as Methyl Violet Lake and Rhodamine B lake, and vat dye type pigments such as Dioxazine Violet, Indanthrene Brilliant Violet and Indanthrene Red Violet; blue dyestuffs typefied by inorganic pigments such as Ultramarine, Prussian Blue, Cobalt Blue and Cerulean Blue, acidic dye type lakes such as Alkali Blue Lake and Peacock Blue, basic dye type lakes such as Victorial Blue Lake, phthalocyanine pigments such as Phthalocyanine Blue, Fast Sky Blue and Heliogen Blue G and vat dye type pigments such as Indigo and Indanthrene Blue BC; and green dyestuffs typefied by inorganic pigments such as Chrome Green, Zinc Green, Chromium Oxide, Veridian, Emerald Green and Cobalt Green, nitroso pigments such as Pigment Green B and Naphthol Green B, azo pigments such as Green Gold, acid dye type lakes such as Acid Green Lake, and basic dye type lakes such as Malachite Green Lake. These dyestuffs are used alone or in combination. These dyestuffs have absorption at 600 to 700 nm to such an extent that data can be detected.

As a chromatic dyestuff having substantial absorption at 600 to 700 nm, halogenated copper phthalocyanine is preferred, and in particular, brominated copper phthalocyanine is the most preferred. In general, in the phthalocyanine green pigment, the benzene ring of its phthalocyanine is halogenated, and at this time, the halogenation degree or the kind of halogen is changed, whereby its main absorption wavelength shifts to a longer wavelength side. Thus, its color indication can be adjusted.

And, chlorine or bromine is usually used as the halogen, and the use of bromine rather than chlorine gives a shift to a longer wavelength side and changes green from a blueish color to a yellowish color. In particular, when the dyestuff is combined with the at least one other dyestuff to form a bar code, etc., of a warm color such as red, orange, yellow, etc., yellowish green as a hue is free from turbidity to a higher extent than blueish green.

In this invention, the other dyestuff means a dyestuff which does not have a main absorption at 600 to 700 nm, and examples of such other dyestuff are dyes or pigments of red, orange, yellow, violet, white, pastel, fluorescence, metallic, pearl and the like. These dyes and pigments may be used alone or in combination as the above other dyestuff. In this invention, the bar code, etc., can be imparted with such a variety of colors.

Therefore, the data-written medium of this invention can be applied to cards, tickets and certificates to a greater extent than conventional media using a dark color ink.

The above data-written medium is measured for reflection strength, transmission strength or absorption strength by means of a detector using a light source having a main wavelength of 600 to 700 nm, whereby data can be read.

Further, this invention provides a data-written medium having data formed of an ink layer containing a chromatic dyestuff having absorption at 600 to 700 nm and at least one other dyestuff and another data formed of another ink layer containing a dyestuff having absorption in near infrared region. This data-written medium is measured for reflection strength, transmission strength or absorption strength of each of the above two layers by means of a detector using a plurality of light sources having a main wavelength of 600 to 1,500 nm, whereby the two data can be individually read.

As the above light source, a light source having a single wavelength is preferred, and a laser is advantageously used. Further, the light absorbers are required to have a maximum absorption peak at a wavelength of light used for the detection, and a half width of the absorption spectrum is required to be as small as possible, whereby mutual interference of the absorption spectra decreases, and the detection accuracy increases. In order to achieve this, it is necessary to disperse the dyestuff having an absorption at 600 to 700 nm as fully as possible or bring it into an almost complete solution state. Then, a sharp absorption spectrum and a small half width can be obtained. Further, the amount of such a dyestuff can be decreased. Therefore, the dispersion state of the above dyestuff is important.

The ink for the ink layer of this invention may be a printing ink or an ink for a variety of printers. Examples of such an ink are printing inks such as gravure ink, flexographic press ink, offset printing ink, screen ink, relief printing ink and inks for thermal transfer, ink-jet, impact, laser and some other printers.

When at least two inks are used for a multiple code according to this invention, a plurality of writing methods can be used. For example, the first data is written, e.g. with a thermal printer, and the second data is then printed.

The following is one embodiment using a transfer ribbon for a thermal printer.

The transfer ribbon is used as follows. The transfer ribbon, which is produced by forming a heat-melting ink layer on one surface of a base film as a substrate, is attached to a receptor sheet, and while these two members are in such an attached state, the heat melting ink layer is melted and transferred by applying a heating means such as a thermal head to the other surface of the substrate, whereby the character or image data constituting the data provided to the heating means is transferred to the receptor sheet.

Known materials are used as materials for such a transfer ribbon. Examples of the base film used as a substrate are polyester films such as polyethylene terephthalate and polyethylene naphthalate films; polyamide films such as nylon, polyolefin films such as a polypropylene film, cellulose films such as a triacetate film; polycarbonate films, and the like. Of these films, a polyester film is the most preferred, since it is excellent in heat resistance, mechanical strength, tensile strength and tensile stability. A base film having a smaller thickness shows higher thermal conductivity. In view of the coatability of the ink layer, however, the thickness of the base film is preferably 3 to 50 μm. The substrate or base film may be provided with a back coating on the surface opposite the surface having the heat-melting ink layer.

The ink for the heat-melting ink layer is prepared by using a wax and a thermoplastic resin as a main vehicle, and as a wax, those having a melting point of 50° to 100° C., preferably 50° to 90° C. are used. The wax is grouped into a natural wax and a synthetic wax. Examples of the natural wax are waxes of plant origin such as candelilla wax, carnauba wax, rice wax, haze wax and jojoba oil; waxes of animal origin such as bees wax, lanolin and spermaceti wax; waxes of mineral origin such as montan wax, ozokerite and ceresine; and waxes of petroleum origin such as paraffin wax, microcrystalline wax, and petrolatum. Examples of the synthetic wax are synthetic hydrocarbons such as Fischer-Tropsch wax and polyethylene wax; modified waxes such as montan wax derivatives, paraffin wax derivatives and microcrystalline wax derivatives; hydrogenated waxes such as hardened castor oil, and fatty acids such as lanolic acid, palmitic acid, myristic acid, stearic acid and 1,2-hydroxystearic acid. The thermoplastic resin has a softening point of not more than 200° C., preferably not more than 180° C. Examples of the thermoplastic resin are polyvinyl chloride, polyvinyl acetate, vinyl chloride-vinyl acetate copolymer, polyethylene, polypropylene, polyacetal, ethylene-vinyl acetate copolymer, ethylene-ethyl acrylate copolymer, polystyrene, polyamide, ethyl cellulose, epoxy resin, xylene resin, ketone resin, petroleum resin, rosin or its derivative, cummaron-indene resin, terpene resin, polyurethane resin, polyvinyl butyral, synthetic rubbers such as styrene-butadiene rubber, nitrile rubber, acryl rubber, and ethylene-propylene rubber.

Further, the following additives may be incorporated: flexibilizers such as oil, weatherability improvers such as an ultraviolet light absorber, a radical polymerization inhibitor and a peroxide disintegrating agent, and a filler. The heat-melting ink is obtained by dispersing or dissolving the chromatic color dyestuff which has substantial absorption at 600 to 700 nm in a vehicle of the above material. The ink layer is formed on a substrate by a hot melt coating method. More preferably, the ink layer is formed by a solvent coating method, in which the above material is dissolved in a solvent to form a coating solution, and the coating solution is coated on a substrate. The resultant coated film is subjected to thermal transfer using, e.g. a thermal transfer printer to form a data-written medium. The multiple bar code is also obtained by further printing data on the data-written medium obtained above.

Many barcode readers and optical character readers (OCR) having a light source emitting light having a wavelength in the visible light range of 600 to 700 nm have been conventionally used. In this case, data written in a conventional data-written medium is read or recognized by detecting the medium in absorbing such light. That is, the dyestuff, ink, pigment, etc., used for writing the data have an absorption in the visible light range of 600 to 700 nm, and such dyestuff, etc., have cool colors such as blue, green, brown, black, etc. Therefore, conventional data-written medium has a cool color.

In contrast, the data-written medium of the present invention is formed from an ink layer of a cool color dyestuff having absorption in the wavelength of 600 to 700 nm in such an amount that does not cause turbidity when mixed with the other dyestuff and from an ink layer of a warm color dyestuff which substantially does not have absorption in the wavelength of 600 to 700 nm such as red, orange, yellow, etc. The cool color dyestuff and the warm color dyestuff may be mixed in advance to form one ink layer.

Accordingly, a data-written medium can be colored, and colors for a data-written medium such as a barcode, etc., can be selected to suit a product design, etc. That is, one limitation imposed on a conventional data-written medium concerning its color is removed. In other words, a barcode suiting the color of a product can be selected.

Further, for example, barcode colors can be classified depending upon the kinds of products, etc., and such classification can be visually easily recognized. That is, products can be easily classified by observing colored barcodes attached thereto. Further, a data-written medium using a cool color dyestuff alone can be easily reproduced by the use of a copying machine. However, a data-written medium using a cool color dyestuff and a warm color dyestuff cannot be reproduced by the use of a color copying machine as far as the reproduced medium has to be read with a device having a light source emitting light having a wavelength of 600 to 700 nm.

This invention will be explained in further detail below by reference to Examples, in which "part" stands for "part by weight."

EXAMPLES

The following inks A to E and G were prepared by dispersing the components shown below with an attriter at room temperature for a period of time shown below. Further, a hot melt ink F was prepared by fully kneading the components indicated below with a three-roll mill heated at 90° to 120° C. for a period of time shown below.

| Ink | Dispersing or kneading time: | | | | | | |
|---|---|---|---|---|---|---|---|
|  | A | B | C | D | E | F | G |
| Dispersing or kneading time (hr.) | 1 | 1 | 2 | 3 | 3 | 3 | 2 |
| Components for ink: | | | | | | | |

Ink A
| | |
|---|---|
| Carnauba wax | 18 parts |
| Ethylene-vinyl acetate copolymer (Evaflex 420, supplied by Mitsui Polychemical Co., Ltd.) | 2 parts |
| IPA (isopropanol) | 15 parts |
| Toluene | 65 parts |

-continued

| Ink B | |
|---|---|
| Fluorescent pigment pink (Epocolor FP-112, supplied by Nippon Shokubai Kagaku Kogyo) | 10 parts |
| Alicyclic saturated hydrocarbon resin (Arkon P-100, supplied by Arakawa Chemical Co., Ltd. | 5 parts |
| Carnauba wax | 5 parts |
| IPA | 15 parts |
| Toluene | 65 parts |
| Ink C | |
| Cinnabar red pigment (Lake Red CN Conc, supplied by Toyo Ink Manufacturing Co., Ltd.) | 5 parts |
| Alicyclic saturated hydrocarbon resin (Arkon P-100, supplied by Arakawa Chemical Co., Ltd.) | 7.5 parts |
| Carnauba wax | 7.5 parts |
| IPA | 15 parts |
| Toluene | 65 parts |
| Ink D | |
| Brominated copper phthalocyanine (Lionol Green 6YK, supplied by Toyo Ink Manufacturing Co., Ltd.) | 1.5 parts |
| Alicyclic saturated hydrocarbon resin (Arkon P-100, supplied by Arakawa Chemical Co., Ltd.) | 9.5 parts |
| Carnauba wax | 10 parts |
| IPA | 15 parts |
| Toluene | 64 parts |
| Ink E | |
| Chlorinated copper phthalocyanine (Lionol Green B-201, supplied by Toyo Ink Manufacturing Co., Ltd.) | 1.5 parts |
| Alicyclic saturated hydrocarbon resin (Arkon P-100, supplied by Arakawa Chemical Co., Ltd.) | 9.5 parts |
| Carnauba wax | 10 parts |
| IPA | 15 parts |
| Toluene | 64 parts |
| Ink F | |
| Carbon black (Carbon MA-600, supplied by Mitsubishi Chemical Industries Ltd) | 0.7 part |
| Ethylene-vinyl acetate copolymer (Evaflex 420, supplied by Mitsui Polychemical Co., Ltd.) | 5.0 parts |
| Carnauba wax | 35.3 parts |
| Paraffin wax | 59.0 parts |
| Ink G | |
| Near infrared light absorber having the following structure. | 1.5 parts |
| Alicyclic saturated hydrocarbon resin (Arkon P-90, supplied by Arakawa Chemical Co., Ltd.) | 9.5 parts |
| Rice wax | 10 parts |
| IPA | 15 parts |
| Toluene | 64 parts |

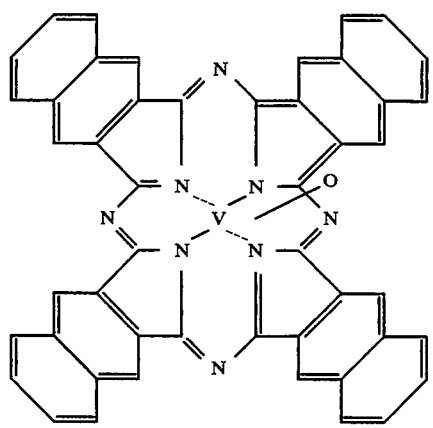

The following thermal transfer ribbons were prepared from the above inks as described below. A polyethylene terephthalate film having a thickness of 6 μm was used as a substrate. The inks A to E and G were applied by a gravure coating method, and the ink F by a hot melt coating method.

Ribbon 1

One g/m² of the ink A and 3 g/m² of the ink B were applied to give a pink, thermal transfer ribbon.

Ribbon 2

One g/m² of the ink A and 3 g/m² of the ink C were applied to give a cinnabar red, thermal transfer ribbon.

Ribbon 3

One g/m² of the ink A, 2 g/m² of the ink B and 0.4 g/m² of the ink D were applied to give a fluorescent pink, thermal transfer ribbon.

Ribbon 4

One g/m² of the ink A, 2 g/m² of the ink C and 0.4 g/m² of the ink D were applied to give a cinnabar red, thermal transfer ribbon.

Ribbon 5

One g/m² of the ink A, 2 g/m² of the ink B and 0.6 g/m² of the ink E were applied to give a fluorescent pink, thermal transfer ribbon.

Ribbon 6

One g/m² of the ink A, 2 g/m² of the ink C and 0.6 g/m² of the ink E were applied to give a cinnabar red, thermal transfer ribbon.

Ribbon 7

One g/m² of the ink A, 0.3 g/m² of the ink G and 2 g/m² of the ink A were applied to give a nearly transparent, thermal transfer ribbon.

Ribbon 8

One g/m² of the ink A, 2 g/m² of the ink B and 0.6 g/m² of the ink F were applied to give a grayish cinnabar red, thermal transfer ribbon.

EXAMPLES 1-4

The ribbons 3, 4, 5 and 6 were used to write data according to a bar code pattern "Code 39" with a bar code printer (B-30-S1, supplied by Tokyo Denki), whereby color bar codes were obtained as data-written media of Examples 1 to 4. The resultant color bar code prints were slightly turbid, but had color indication of nearly complete reproduction of original color tones. These data-written media were read with a bar code reader (TCD-4000 & TBR-4000, using CCD as a sensor, supplied by Token) to show that data was codewise readable.

COMPARATIVE EXAMPLES 1-3

The above procedure was repeated by using the ribbons 1 and 2. The resultant data-written media could not be read with the above bar code reader. Further, the above procedure was repeated by using the ribbon 8. The resultant data-written medium was readable with a bar code reader. However, this medium had clearly poor color indication.

EXAMPLE 5

The ribbons 5 and 7 were used to write different data in one place according to "Code 39" to obtain a data-written medium. The data formed from the ribbon 5 was read with a bar code detector using a 632.8 nm He-Ne laser as a light source (Lasercheck LC2811, supplied by Symbol Technologies, Inc.), and the data formed from the ribbon 7, with a bar code reader (THLS-6000 & TBR-6000, using a 780 nm laser as a light source, supplied by Token). These data were all readable codewise.

COMPARATIVE EXAMPLE 4

The ribbons 8 and 7 were used to write different data in one place in the same way as in Example 5. The data formed from the ribbon 8 could be read. However, data formed from the ribbon 7 was not readable.

EXAMPLE 6

The following components were dispersed fully with an attriter at room temperature to prepare inks H and J.

| Ink H | |
|---|---|
| Carnauba wax | 18 parts |
| Ethylene vinyl acetate copolymer (Evaflex 420, supplied by Mitsui Polychemical Co., Ltd) | 2 parts |
| IPA (isopropanol) | 15 parts |
| Toluene | 65 parts |
| Ink J | |
| C.I. Pigment Violet 1 (Ultrarose 3B, supplied by Toyo Ink Manufacturing Co., Ltd.) | 1.5 parts |
| Alicyclic saturated hydrocarbon resin (Arkon P-100, suppled by Arakawa Chemical Co., Ltd.) | 9.5 parts |
| Carnauba wax | 10 parts |
| IPA | 15 parts |
| Toluene | 64 parts |

Further, the following components were fully kneaded with a three-roll mill heated to 90° to 120° C. to prepare a hot melt ink K.

| Ink K | |
|---|---|
| Fluorescent pigment pink (Epocolor FP-10, supplied by Nippon Shokubai Kagaku Kogyo) | 20 parts |
| Ethylene-vinyl acetate copolymer (Evaflex 577-2, supplied by Mitsui Polychemical Co., Ltd:) | 5 parts |
| Carnauba wax | 16 parts |
| Paraffin wax (HNP-9, supplied by Nippon Seiro) | 59 parts |

The ink H was applied to a 6 μm thick polyethylene terephthalate film with a gravure printing machine such that the dried film amount was 1 g/m². And, the ink K was applied thereon with a hot melt coater such that its dried film amount was 3 g/m². Further, the ink J was applied thereon with a gravure printing machine such that the dried film amount was 1 g/m² to prepare a pink, thermal transfer ribbon.

A bar code pattern was printed by using the thermal transfer ribbon to give a pink, data-written medium, although its color was slightly turbid. When this medium was read with a bar code detector having a reading wavelength of 632.8 run (Lasercheck LC2811, supplied by Symbol Technologies Inc.), the data was codewise readable.

COMPARATIVE EXAMPLE 5

The ink H was applied to a 6 μm thick polyethylene terephthalate film with a gravure printing machine such that its dried film amount was 1 g/m² and the ink J was applied thereon with a hot melt coater such that its dried film amount was 3 g/m² to prepare a pink, thermal transfer ribbon.

A bar code pattern was printed by using the thermal transfer ribbon to give a brightly pink data-written medium. However, data was not readable with a bar code detector having a reading wavelength of 632.8 nm.

EXAMPLE 7

A varnish was prepared by heating a coating solution of the following composition to 200° C. to dissolve the resin.

| Rosin-modified phenolic resin varnish | |
|---|---|
| Rosin-modified phenolic resin (Tamanol 356, supplied by Arakawa Chemical Co., Ltd.) | 50 parts |
| Linseed oil | 15 parts |
| Solvent (No. 3 solvent, supplied by Nippon Petrochemical) | 35 parts |

Then, the following components were kneaded with a three-mill to prepare an ink L.

| Ink L | |
|---|---|
| C.I. Pigment Green 8 (Sumitone Green B, supplied by Sumitomo Chemical Co., Ltd.) | 4.3 parts |
| C.I. Pigment Red 38 (Lionol Red B, supplied by Toyo Ink Manufacturing Co., Ltd.) | 13 parts |
| Rosin-modified phenolic resin varnish | 68 parts |
| Solvent (No. 3 solvent, supplied by Nippon Petrochemical) | 14.7 parts |

A bar code was printed on art paper by an offset printing method such that its dried film amount was 1 g/m², whereby a slightly darkish red, data-written medium was obtained. Data was codewise readable with a bar code detector having a reading wavelength of 632.8 nm.

COMPARATIVE EXAMPLE 6

The following components were kneaded with a three-roll mill to prepare an ink M.

| Ink M | |
|---|---|
| C.I. Pigment Red 38 (Lionol Red B, supplied by Toyo Ink Manufacturing Co., Ltd.) | 15 parts |
| Rosin-modified phenolic resin varnish | 70 parts |
| Solvent (No. 3 solvent, supplied by Nippon Petrochemical) | 15 parts |

A bar code was printed on art paper by an offset printing method such that its dried film amount was 1 g/m², whereby a red, data-written medium was obtained. Data was not readable with a bar code detector having a reading wavelength of 632.8 nm.

EXAMPLE 8

The following coating solutions were fully dispersed with an attriter at room temperature to prepare inks N and O.

| Ink N | |
|---|---|
| Fluorescent pigment pink (Epocolor FP-l0, supplied by Nippon Shokubai Kagaku Kogyo) | 10 parts |
| Alicyclic saturated hydrocarbon resin (Arkon P-100, supplied by Arakawa Chemical Co., Ltd.) | 5 parts |
| Carnauba wax | 5 parts |
| IPA | 15 parts |
| Toluene | 65 parts |
| Ink O | |
| C.I. Pigment Blue 1 (Ultrablue B, supplied by Toyo Ink Manufacturing Co., Ltd.) | 1.5 parts |
| Alicyclic saturated hydrocarbon resin (Arkon P-100, supplied by Arakawa Chemical Co., Ltd.) | 9.5 parts |
| Carnauba wax | 10 parts |
| IPA | 15 parts |
| Toluene | 64 parts |

The ink H was applied to a 6 μm thick polyethylene terephthalate film with a gravure printing machine such that its dried film amount was 1 g/m², and the ink N was applied thereon such that its dried film amount was 3 g/m². Further, the ink O was applied thereon such that its dried film amount was 1 g/m² to prepare a pink, thermal transfer ribbon.

A bar code pattern was printed by using the thermal transfer material to give a slightly turbid pink data-written medium. However, data was codewise readable with a bar code detector having a reading wavelength of 632.8 run.

COMPARATIVE EXAMPLE 7

The following components were fully dispersed with an attriter at room temperature to prepare an ink P.

| Ink P | |
|---|---|
| Carbon black (MA-600, supplied by Mitsubishi Chemical Industries Ltd) | 0.7 part |
| Alicyclic saturated hydrocarbon resin (Arkon P-100, supplied by Arakawa Chemical Co., Ltd. | 10.3 parts |
| Carnauba wax | 10 parts |
| IPA | 15 parts |
| Toluene | 64 parts |

The ink H was applied to a 6 μm thick polyethylene terephthalate film with a gravure printing machine such that its dried film amount was 1 g/m², and the ink N was applied thereon such that its dried film amount was 3 g/m². Further, the ink P was applied thereon such that its dried film amount was 1 g/m² to prepare a greyish pink, thermal transfer ribbon.

A bar code pattern was printed by using the thermal transfer ribbon to give a data-written medium. Data was codewise readable with a bar code detector having a reading wavelength of 632.8 nm. However, this medium had turbid and poor color indication.

EXAMPLE 9

The following components were fully dispersed with an attriter at room temperature to prepare an ink Q.

| Ink Q | |
|---|---|
| Alicyclic saturated hydrocarbon resin (Arkon P-100, supplied by Arakawa Chemical Co., Ltd.) | 10 parts |
| Carnauba wax | 10 parts |
| Near infrared absorber (PRO-JET IR SC101756, supplied by ICI Japan) | 0.2 part |
| IPA | 14.8 parts |
| Toluene | 65 parts |

The ink H was applied to a 6 μm thick polyethylene terephthalate film with a gravure printing machine such that its dried film amount was 1 g/m² and the ink Q was applied thereon such that its dried film amount was 1 g/m². Further, the ink H was applied thereon such that its dried film amount was 2 g/m² to prepare a nearly transparent, thermal transfer ribbon.

Two different data were printed in one place by using the above thermal transfer ribbon and the transfer ribbon obtained in Example 8 to give a dual bar code (dual data-written) medium. When this medium was read with a bar code reader having a reading wavelength of 780 nm (TBR-6000, supplied by Token), data was readable according to the code formed of the thermal transfer ribbon of this Example. Further, when the medium was read with a bar code detector having a reading wavelength of 632.8 nm, data was readable according to the codes formed of the transfer ribbon of Example 8.

COMPARATIVE EXAMPLE 8

The thermal transfer ribbon of Comparative Example 7 and the thermal transfer ribbon of Example 9 were used to print two different data in one place, whereby a data-written medium of a dual bar code was obtained. When this medium was read with a bar code detector having a reading wavelength of 632.8 nm, data according to the code formed of the thermal transfer ribbon of Comparative Example 7 was readable. When this medium was read with a bar code reader having a reading wavelength of 780 nm, data according to the code formed of the thermal transfer ribbon of Example 9 was not readable.

What is claimed is:

1. A data-written medium in which the data is readable with a device having a light source emitting light in a wavelength of 600 to 700 nm, the medium comprising a substrate and an ink layer containing not more than 0.1 g/m² of a chromatic color dyestuff having absorption substantially at 600 to 700 nm and at least one other color dyestuff which does not have a main absorption in the wavelength of 600 to 700 nm, said ink layer being formed on said substrate and having a form constituting the data.

2. A medium according to claim 1, wherein the form constituting the data is a bar code.

3. A medium according to claim 1, wherein the form constituting the data is a numeric or alphabetic character.

4. A medium according to claim 1, wherein said at least one other color dyestuff is a warm color dyestuff and/or a white color dyestuff.

5. A medium according to claim 4, where said warm color dyestuff is at least one member selected from the group consisting of red, orange, yellow and purple dyestuffs.

6. A medium according to claim 1, wherein said color dyestuff is a dye or a pigment.

7. A medium according to claim 1, wherein said chromatic color dyestuff is contained in an amount of 0.005 g/m² to 0.08 g/m².

8. A medium according to claim 1, wherein said ink layer is a layer formed from a heat-melting ink by a thermal transfer method.

9. A medium according to claim 1, wherein said chromatic color dyestuff having a substantial absorptivity at 600 to 700 nm is a blue or green dyestuff.

10. A medium according to claim 1, wherein said chromatic color dyestuff having a substantial absorptivity at 600 to 700 nm is a halogenated copper phthalocyanine.

11. A medium according to claim 10, wherein said halogenated copper phthalocyanine is a brominated copper phthalocyanine.

12. A medium according to claim 1, which contains data which is readable with a light source having a main wavelength of 600 to 700 nm by measuring its reflection strength, transmission strength or absorption strength.

13. A medium according to claim 1, wherein said ink layer is formed by laminating a first ink layer containing said chromatic color dyestuff and a second ink layer containing said at least one other color dyestuff.

14. A data-written medium in which the data is readable with a device having a light source emitting light having a main wavelength of 600 to 1,500 nm, the medium comprising a substrate, a first ink layer containing not more than 0.1 g/m² of a chromatic color dyestuff having substantial absorption at 600 to 700 nm and at least one other color dyestuff which does not have a main absorption at 600 to 700 nm, and a second ink layer containing a substance having substantial absorption in a near infrared region, each of said first and second ink layers being formed to individually have a form constituting a corresponding data.

15. A data-written medium in which the data is readable with a device having a light source emitting light in a wavelength of 600 to 700 nm, the medium comprising a substrate, a first ink layer containing not more than 0.1 g/m² of a chromatic color dyestuff having absorption substantially at a wavelength of 600 to 700 nm and a second ink layer containing a warm color dyestuff which does not have a main absorption in the wavelength of 600 to 700 nm, said first and second ink layers being formed on the substrate and having a form which constitutes data.

16. A data-written medium in which the data is readable with a device having a light source emitting light having a main wavelength of 600 to 1,500 nm, the medium comprising a substrate, a first ink layer containing not more than 0.1 g/m² of a chromatic color dyestuff having substantial absorption at 600 to 700 nm, a second ink layer containing at least one other color dyestuff which does not have a main absorption at 600 to 700 nm, and a third ink layer containing a substance having substantial absorption in a near infrared region, each of said first and third ink layers being formed to individually have a form constituting a corresponding data.

* * * * *